Oct. 7, 1958 K. J. BRAUN Re. 24,547

TAG-MARKING AND FORMING MACHINE

Original Filed Sept. 12, 1950 12 Sheets-Sheet 1

INVENTOR.
KARL J. BRAUN
BY Thomas J. Ryan
ATTORNEY

TAG-MARKING AND FORMING MACHINE

Original Filed Sept. 12, 1950 12 Sheets-Sheet 2

INVENTOR.
KARL J. BRAUN
BY Thomas J. Ryan
ATTORNEY

TAG-MARKING AND FORMING MACHINE

Original Filed Sept. 12, 1950 12 Sheets-Sheet 3

INVENTOR.
KARL J. BRAUN
BY Thomas J. Ryan
ATTORNEY

TAG-MARKING AND FORMING MACHINE

Original Filed Sept. 12, 1950 12 Sheets-Sheet 4

INVENTOR.
KARL J. BRAUN
BY Thomas J. Ryan
ATTORNEY.

TAG-MARKING AND FORMING MACHINE

Original Filed Sept. 12, 1950 12 Sheets-Sheet 5

INVENTOR.
KARL J. BRAUN
BY Thomas J. Ryan
ATTORNEY.

TAG-MARKING AND FORMING MACHINE

Original Filed Sept. 12, 1950 12 Sheets-Sheet 6

INVENTOR.
KARL J BRAUN
BY Thomas J Ryan
ATTORNEY.

TAG-MARKING AND FORMING MACHINE

Original Filed Sept. 12, 1950 12 Sheets-Sheet 7

INVENTOR.
KARL J. BRAUN
BY Thomas J. Ryan,
ATTORNEY.

TAG-MARKING AND FORMING MACHINE

Original Filed Sept. 12, 1950 12 Sheets-Sheet 8

INVENTOR.
KARL J. BRAUN
BY Thomas J. Ryan
ATTORNEY.

TAG-MARKING AND FORMING MACHINE

Original Filed Sept. 12, 1950 12 Sheets-Sheet 9

INVENTOR.
KARL J. BRAUN
BY Thomas J. Ryan
ATTORNEY

TAG-MARKING AND FORMING MACHINE

Original Filed Sept. 12, 1950 12 Sheets-Sheet 10

INVENTOR.
KARL J. BRAUN
BY Thomas J. Ryan
ATTORNEY.

TAG-MARKING AND FORMING MACHINE

Original Filed Sept. 12, 1950 12 Sheets-Sheet 11

INVENTOR.
KARL J. BRAUN
BY Thomas J. Ryan
ATTORNEY.

TAG-MARKING AND FORMING MACHINE

Original Filed Sept. 12, 1950 12 Sheets-Sheet 12

INVENTOR.
KARL J. BRAUN
BY Thomas J. Ryan
ATTORNEY.

United States Patent Office

Re. 24,547
Reissued Oct. 7, 1958

24,547

TAG-MARKING AND FORMING MACHINE

Karl J. Braun, Stamford, Conn., assignor, by mesne assignments, to A. Kimball Company, New York, N. Y., a corporation of New York Original No. 2,708,873, dated May 24, 1955, Serial No. 184,423, September 12, 1950. Application for reissue March 14, 1957, Serial No. 646,185

13 Claims. (Cl. 101—19)

Matter enclosed in heavy brackets [ ] appears in the original patent but forms no part of this reissue specification; matter printed in italics indicates the additions made by reissue.

The present invention relates generally to printing and perforating machines, and more particularly to a tag-marking machine devised to print and perforate information upon small tags, for example, small price tags such as those used in the apparel industry for keeping inventory records, billing, reordering, merchandising control, accounting, and similar procedures.

Thus the present invention comprehends the provision of an improved tag-marking machine in which information can be printed on the tag and the same information perforated in the tag in the form of coded holes; a machine in which both the printing and perforating set-ups are simultaneously effected through a single set-up of the keyboard; one having a novel counter mechanism to control [the printing and perforating of identical information upon single part tags or upon multiple part tags,] from one setting of the keyboard *the printing and perforating of identical information on each of a succession of tag parts a selected number of which form a tag*; novel and positive tag feeding mechanism which is effective to feed [a single tag] *tags* or a continuous web or strip of printable and perforateable material; a machine having a tag cut-off mechanism which is controlled by the counter mechanism, and which is selectively effective to sever [single part tags or multiple part tags] from a continuous web or strip *tags each having a selected number of tag parts*; a machine adapted to perforate coded holes in a tag in such a manner that the location of the punched holes relative to the marginal edges of the tag is not important when they are subsequently sensed by a reader to interpret the information represented by the punched holes; a machine which simultaneously prints and perforates the same information upon successively fed tags; and a tag-marking machine which is relatively small, rugged, compact, portable, fast and efficient in operation, and one which may be manufactured economically.

A specific machine embodying the present invention is shown in the accompanying drawings and described in this specification, but it is to be clearly understood that some of the features shown and described may be modified considerably without departing from the invention, and that wherever the term "tag" is used, it is intended to include cards, tickets, sheets, strips, continuous webs or any other suitable printable and perforateable material.

Still further objects and advantages of the present invention will appear from the following description, reference being had to the accompanying drawings, in which.

GENERAL DESCRIPTION

It is believed that the detailed description of the present invention will be more readily understood if it is preceded by a brief general description of the functioning of the machine in the performance of printing and perforating information upon an original record which may be used for merchandise control, inventory records, all types of billing and factory inventory control, railroad and airline passenger ticket accounting, insurance premium control, and numerous other record keeping and accounting procedures, wherein information must be compiled.

Figure 15:
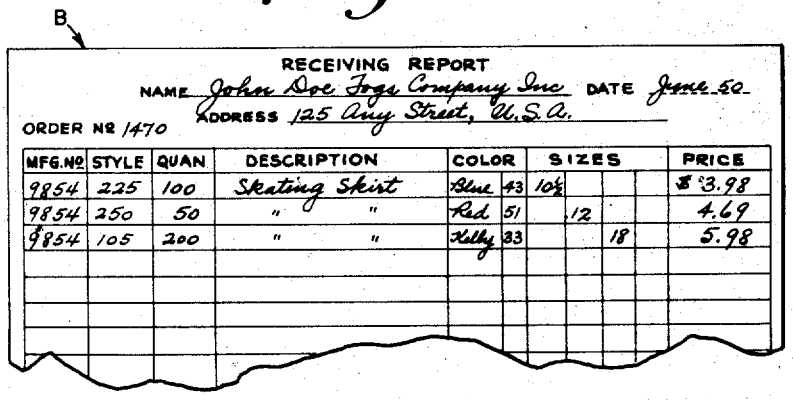
Fig. 15 is a fragmentary view illustrating a receiving report.
Figure 16:
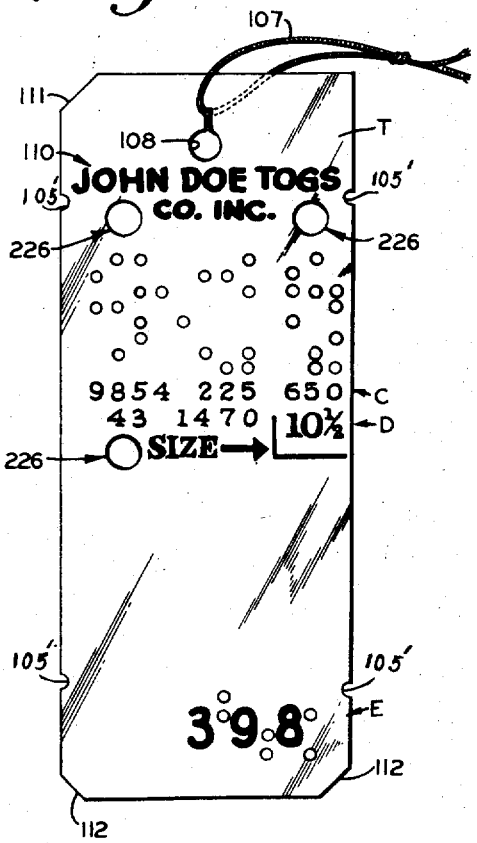
Fig. 16 is a face view of a single part garment tag as it will appear after being punched and printed with information contained on the first line of the receiving report shown in Fig. 15.

An understanding of the general principles of operation of the machine may best be acquired by following the keyboard set-up and printing and perforating of a single part tag with reference to a specific example, such as the one diagrammed in Figs. 15 and 16. A conventional "invoice" or "receiving report" for a number of garments such as "skating skirts" is illustrated in Fig. 15, and in Fig. 16 is shown an enlarged view of a garment price tag which has been printed and perforated with certain information contained on the receiving report.

For the purpose of this general description, let it be assumed that one hundred single part tags are to be prepared for each skating skirt listed on the first line of the receiving report B with printed and perforated information such as the date; manufacturer's number; style of the skirts; color; order number; size; price, etc. In the present machine, there are thirty columns of information and thirty keys in the keyboard, or one key for each column of information, with each column represented by a four-hole code, such for example, as the code shown in Fig. 17.

To enter information into the keyboard, for instance, the example above given, three key levers are set to represent the date 6–50, four key levers are set to represent the manufacturer's number 9854, three key levers are set to values corresponding to the style 225, etc., until all desired information has been entered into the keyboard. When the keyboard set-up has thus been completed, the printing and perforating instrumentalities have also been simultaneously set accordingly. The counter is now set for 100 tags, and upon depression of the starting button 161 the machine will operate continuously until 100 identical tags have been printed and punched according to the information set in the keyboard.

It may be pointed out at this time that a completely printed and perforated single part tag is ejected from the machine at the end of each machine cycle after the sixth cycle for reasons later explained.

FRAMING

An understanding of the mechanism of this tag-marking machine will be facilitated by first considering the frame-work. The machine has a main frame and several detachable units or assemblies.

The main frame has for its principal members a base plate 1 (Figs. 2 and 3), a left-hand side plate 2, a right-hand side plate 3, and several transverse connecting bars 4 secured at their ends to the side plates 2 and 3.

Figure 3:
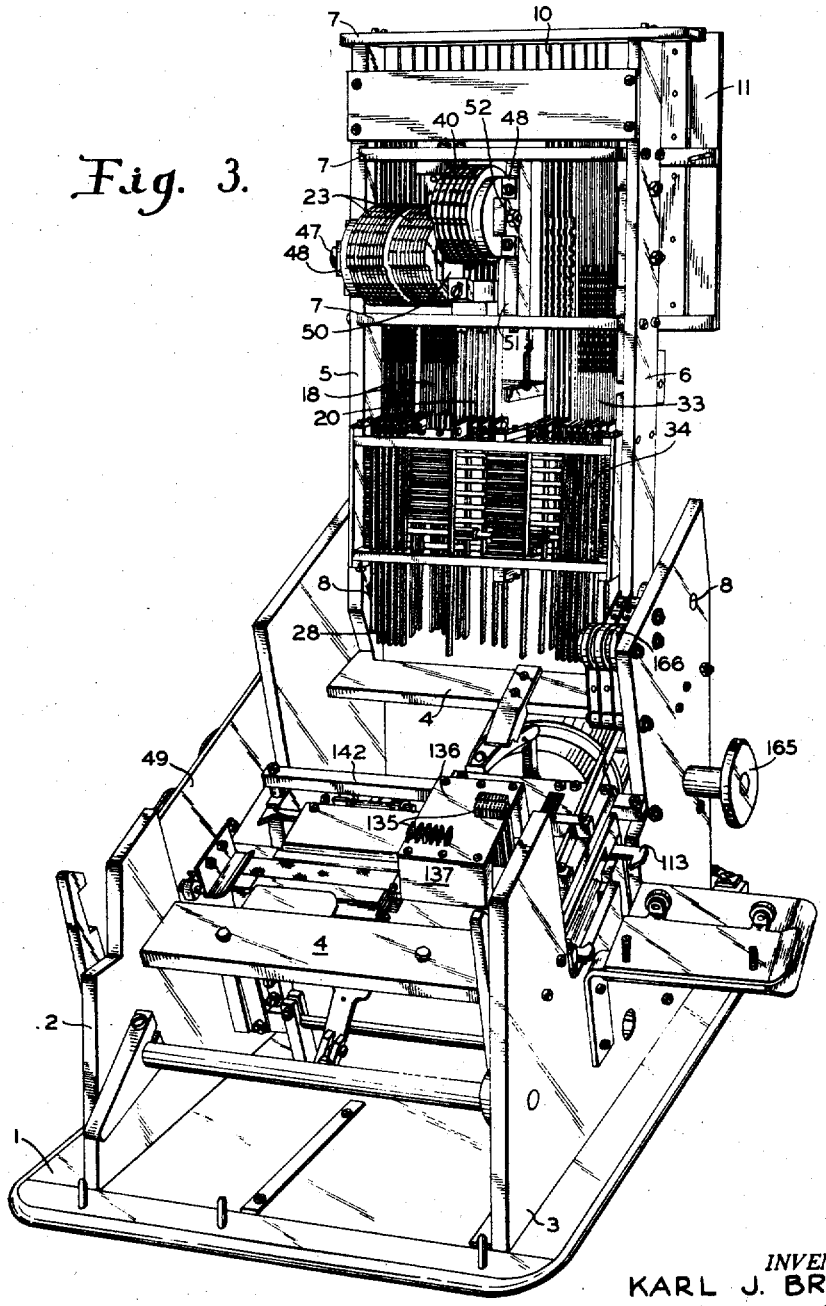
Fig. 3 is a right hand perspective view of the machine, with the covers removed and with the keyboard section swung upwardly upon its pivot studs, to expose the punch section, type wheels, gag bars, and numerous other parts which are concealed from view when the keyboard section is in place as shown in Fig. 2.
Figure 4:
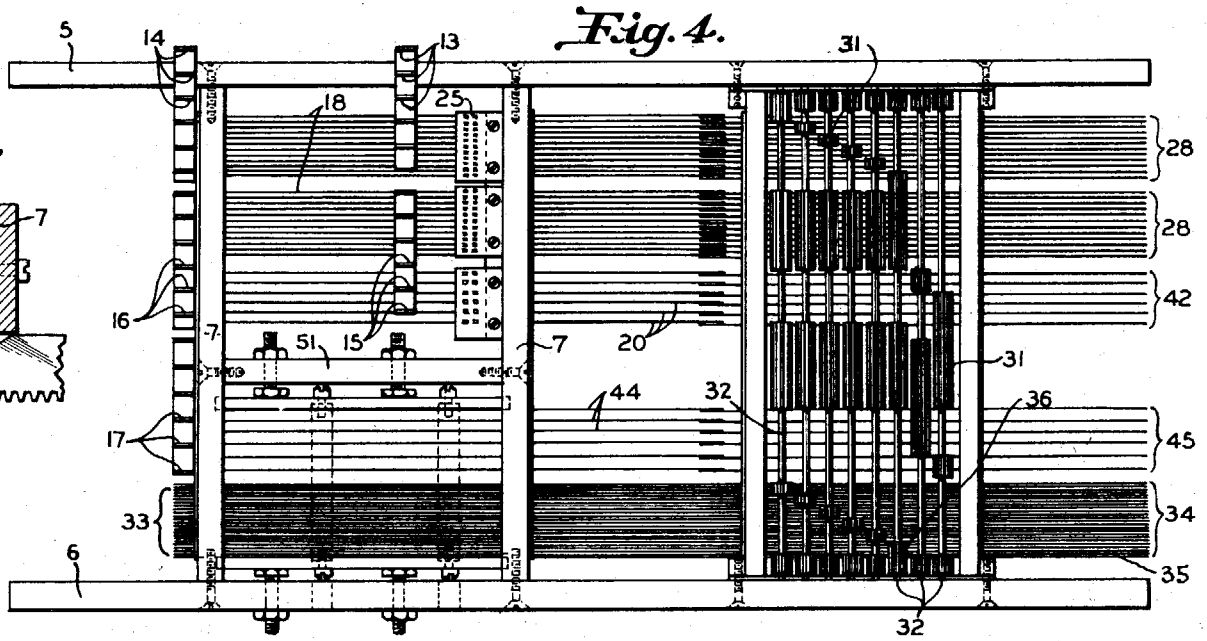
Fig. 4 is a top plan view of the keyboard section with certain parts omitted for the sake of clarity.

The frame for the keyboard section, printing wheels, differentially movable actuators, punch gags, transfer pinions etc., comprises two relatively narrow side plates 5 and 6 which are joined by a plurality of transverse connecting bars 7, some of which are clearly shown in Figs. 3 and 4. This frame is pivotally mounted in the back part of the machine between the main side plates 2 and 3 upon short studs 3, projecting inwardly from said plates. This enables the keyboard frame and associated parts to be swung upwardly about the pivot studs 8, as clearly illustrated in Fig. 3, for ready access to the interior of the machine during adjustment, inspection or repairs.

KEYBOARD SECTION

Figure 2:
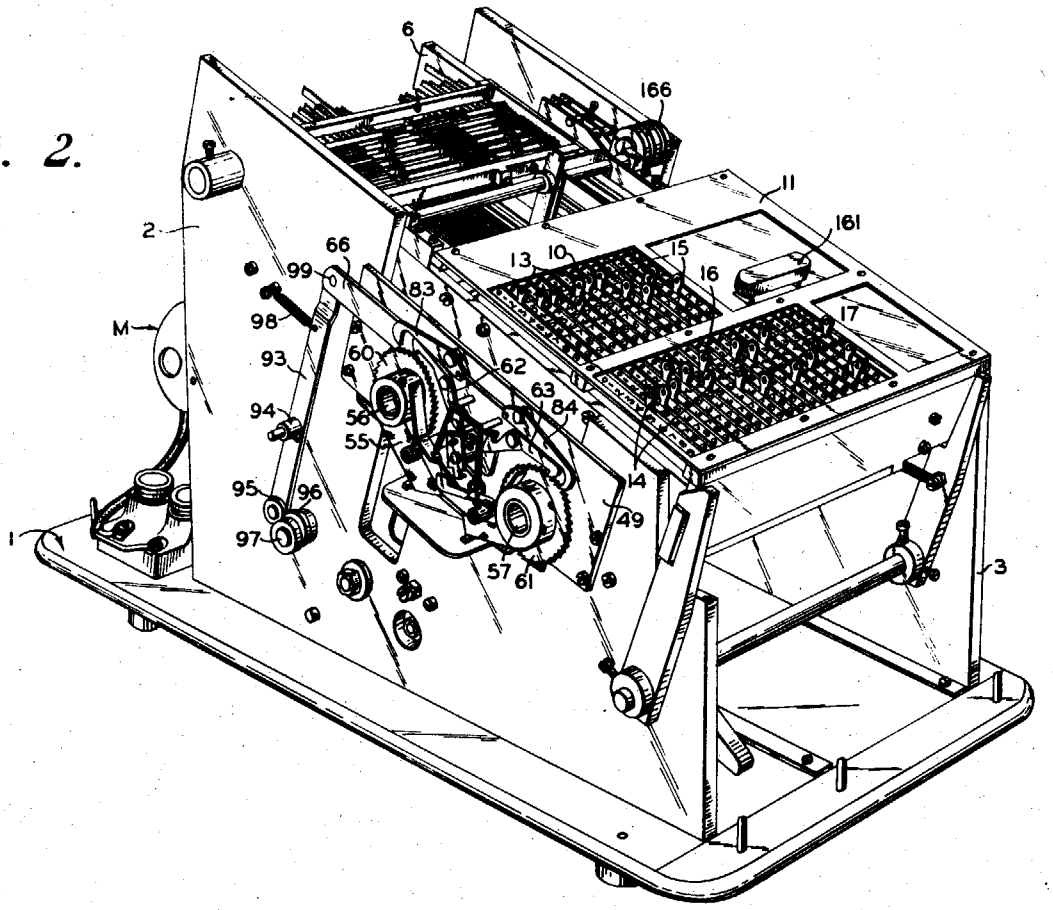
Fig. 2 is a left side perspective view of the machine, the covers being removed to expose the base, side plates, ribbon feeding mechanism, and various other parts concealed by the covers.
Figure 5:
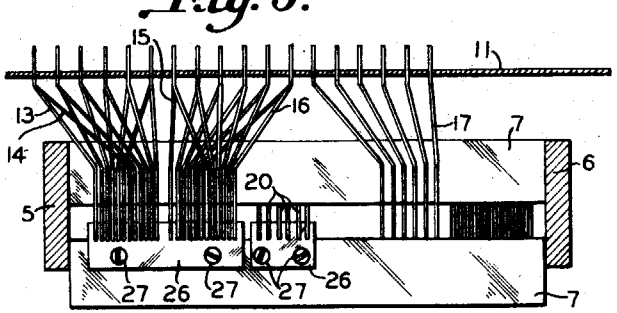
Fig. 5 is a front end elevational view of Fig. 4 with certain parts omitted and the side plates shown in vertical section.
Figure 6:
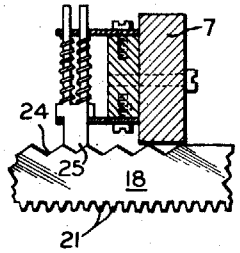
Fig. 6 is a fragmentary detail view, partly in vertical section of one of the actuator detents.
Figure 18:
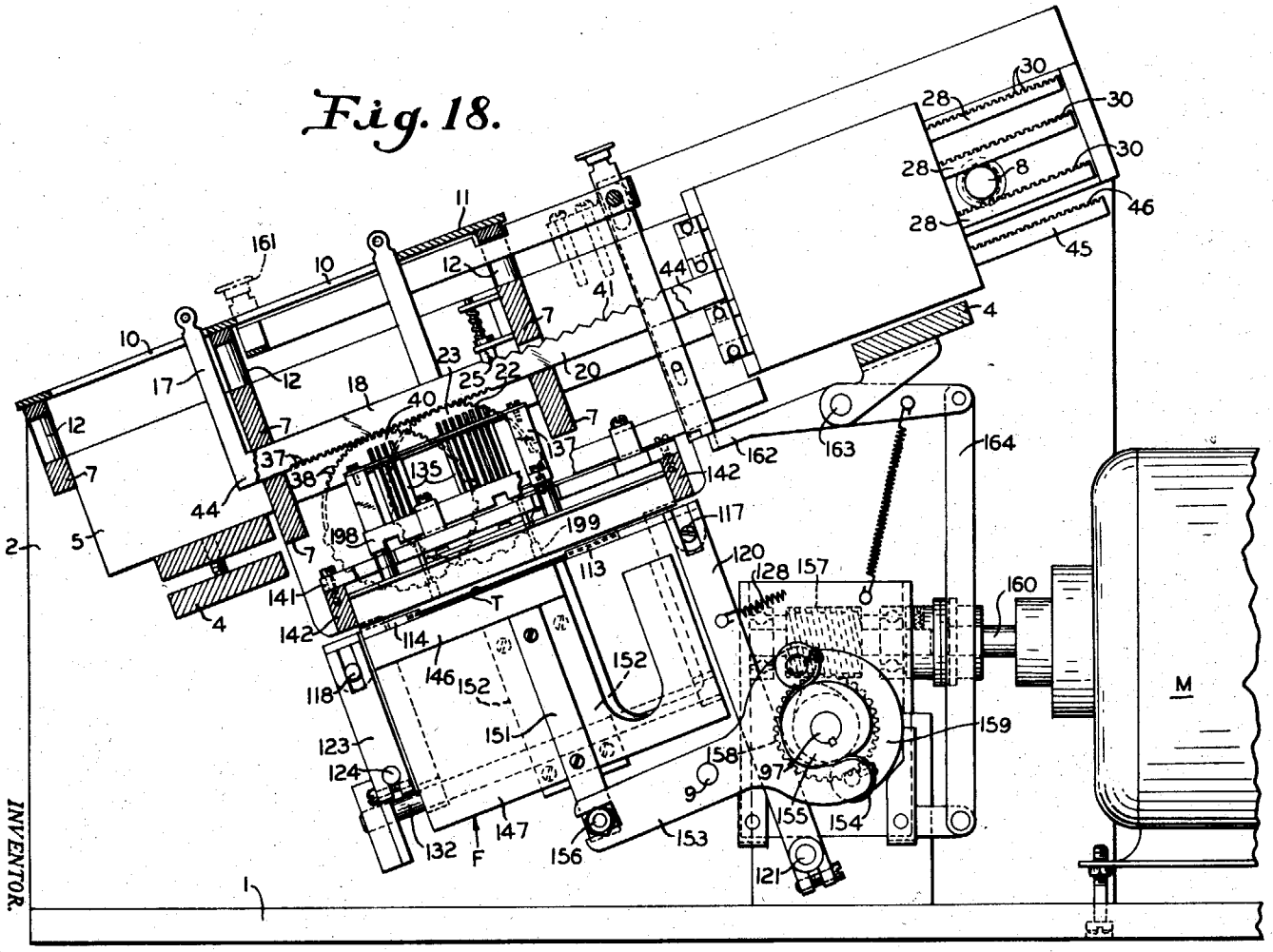
Fig. 18 is a right hand side elevation partly in vertical section of the machine with the covers removed, and with part of the base and motor broken away due to lack of space.

As previously mentioned, from one to thirty columns of information may be entered into the keyboard of the present machine. Accordingly, there are thirty sliding keys, all of which project upwardly through narrow slots 10 in the keyboard plate 11 as best shown in Fig. 2. The plate 11 is spaced above and parallel to the keyboard frame plates 5 and 6, and is supported by a plurality of spacers 12 suitably secured between the plate and several of the connecting bars 7, as best illustrated in Fig. 18. For convenience in describing the thirty keys, they will be considered in groups of six, and with reference to Figs. 2, 4 and 5, the first group of six keys are designated by reference numeral 13, the second group of six keys by numeral 14, the third group of six keys by numeral 15, the fourth group of six keys by numeral 16, and the fifth group of six keys by numeral 17. Each key in the groups 13 to 16 respectively has a differentially movable actuator or slide 18, and each key in the group 17 has an associated differentially movable actuator or slide 20. Each actuator slide 18 has rack teeth 21 on its lower edge and these teeth are in permanent mesh with the gear teeth 22, of its respective type wheel 23, as clearly shown in Figs. 10 and 18. The upper edge of each actuator slide 18 is provided with eleven V-shaped detent notches 24 which cooperate with a spring pressed detent 25 (see Fig. 6) to selectively hold the actuator slide in any one of eleven positions to which it may be shifted by its associated key. All of the actuator slides 18 and 20 respectively, are supported and guided horizontally by four of the cross bars 7 and guided vertically by combs 26, the latter being attached to the lower cross bars 7, by screws 27, as best shown in Fig. 5.

It will now be observed from Figs. 3 and 4, that the present machine has twenty-four actuators 18, each having an extension transfer rack 28 connected therewith and provided with rack teeth 30 on its upper edge. The teeth 30 are permanently meshed with an associated transfer pinion 31 fast on a pinion shaft 32. Similarly, there are twenty-four differentially movable gag bars 33, or one gag bar for each actuator 18. Each gag bar 33 has an extension transfer rack 34 provided with rack teeth 35 which mesh with an associated transfer pinion 36 on its respective pinion shaft 32.

Figure 10:
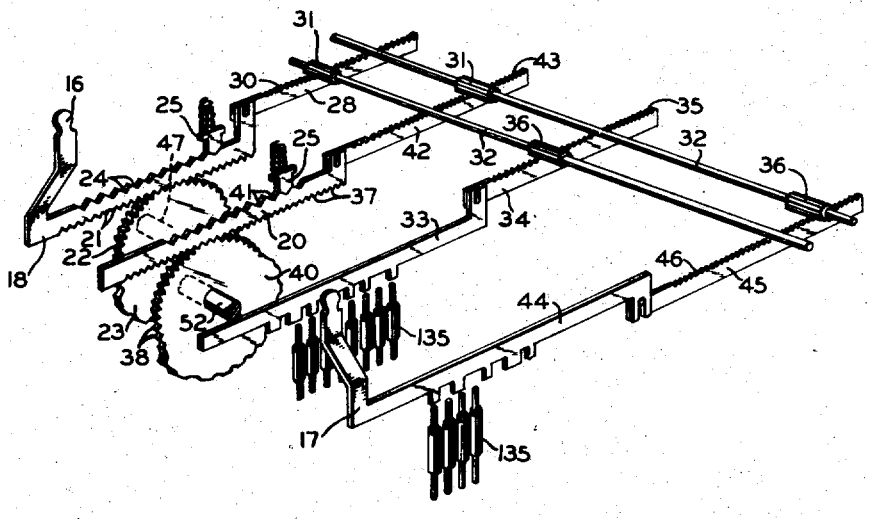
Fig. 10 is a perspective view illustrating two of the thirty keys and their associated parts.

It will now be understood that whenever an actuator 18 or 20 is moved differentially by its associated key lever, an associated gag bar 33 or 34 will be differentially moved in unison therewith, through the associated transfer extension racks 28, 34, 42 and 45, transfer pinions 31 and 36 and pinion shafts 32 respectively, as best illustrated in Fig. 10.

Each actuator slide 20 has rack teeth 37, cut in its lower edge, which mesh with gear teeth 38 of its respective type wheel 40, as clearly shown in Fig. 10. The upper edge of each actuator slide 20 is provided with eleven V-shaped detent notches 41, which cooperate with one of the spring pressed detents 25, to selectively hold said actuator slide in any one of eleven positions to which it may be shifted by its associated key 17. Each actuator slide 20 has an extension transfer rack 42 connected therewith having rack teeth 43 on its upper edge. The teeth 43 are in mesh with an associated transfer pinion 31 fast on its particular pinion shaft 32.

PRINTING SECTION

Figure 14:
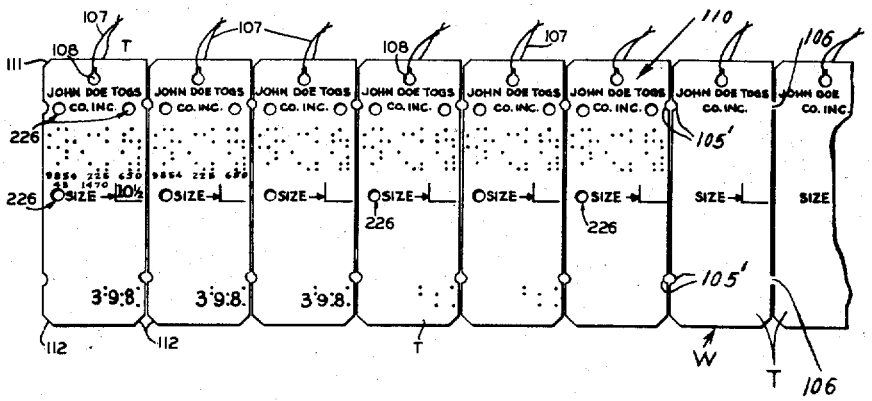
Fig. 14 illustrates the progress of a tag through the machine and the sequential order in which it is punched and printed during six machine cycles.

By a study of the tag shown in Fig. 16 it will be observed that printing takes place at three different stations or lines, indicated at C, D and E, and each line is printed during a different cycle of the machine as will presently appear in connection with Fig. 14. The present machine has twenty-four printing wheels designated 23 (see Fig. 3) and six printing wheels designated 40. All of the printing wheels 23 are rotatably journaled upon a common shaft 47 one end of which is mounted in a block 48 secured to the lower edge of side plate 5, and the other end of which is mounted in a plate 50 mounted between the bars 7 as best shown in Fig. 3. The six printing wheels designated 40 are rotatably journaled upon a common shaft 52 which is supported by a similar block 48 attached to the lower edge of frame plate 51 at one end and at the other end by the plate 50. Shaft 52 is located forwardly in the machine relative to shaft 47, or to the right of shaft 47 as shown by dotted lines in Fig. 8, in order to space the printing effected by printing wheels 40 from the printing effected by printing wheels 23.

In order to effect printing at two different places, or stations C and D upon the tags, by the twenty-four printing wheels 23, the type characters 53 on twelve of the twenty-four wheels are radially spaced from the type character 54 on the remaining twelve printing wheels as best shown in Fig. 3.

RIBBON FEED AND REVERSING MECHANISM

As above mentioned, printing takes place at three different zones upon each tag as clearly indicated at C, D and E, and for this reason the inked ribbon 55 (see Fig.

Figure 7:
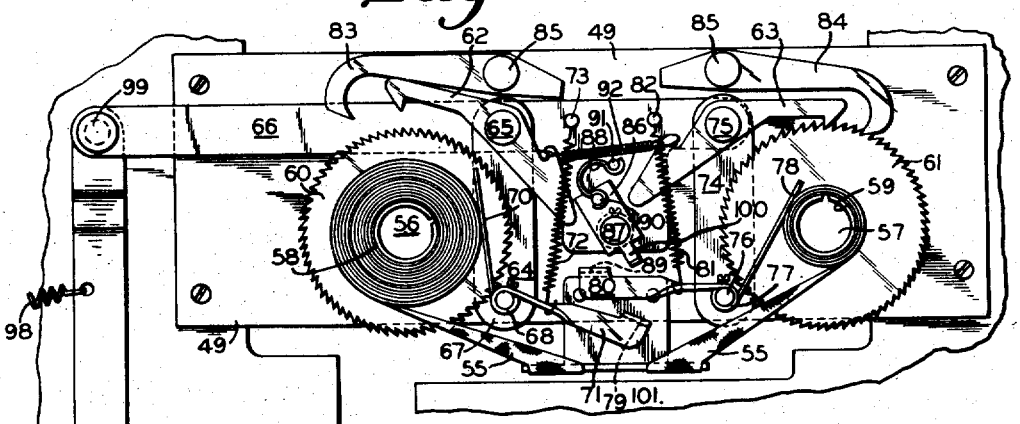
Fig. 7 is a side elevational view of the ribbon feeding mechanism.
Figure 8:
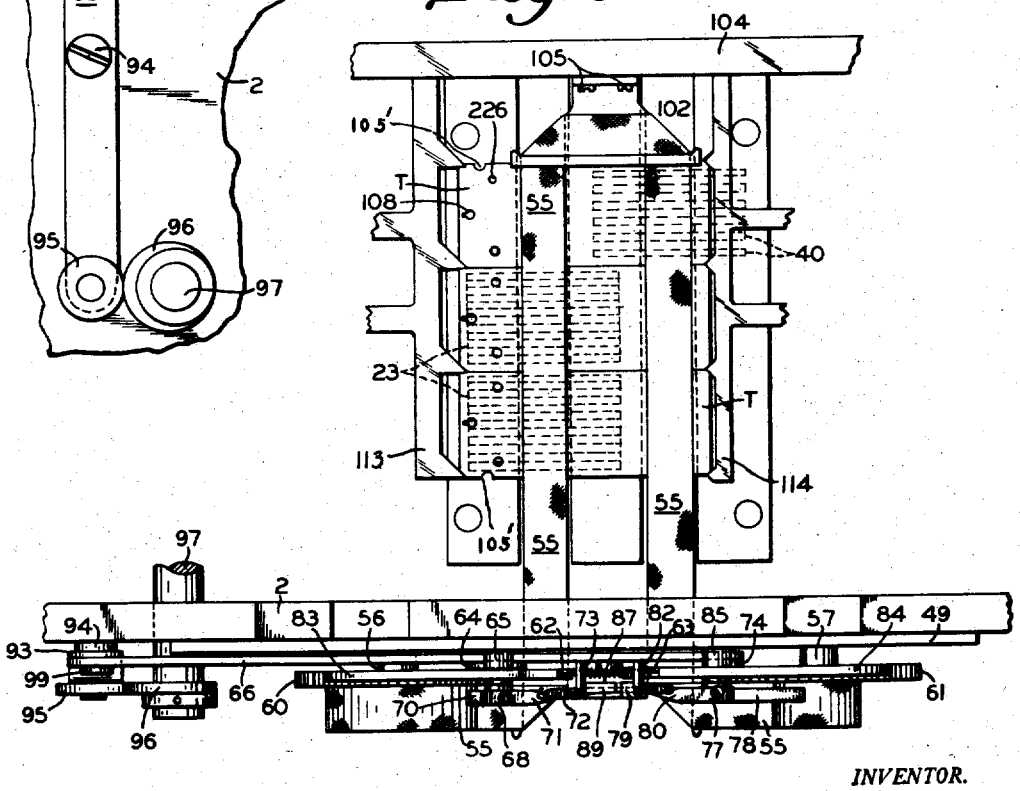
Fig. 8 is a plan view of Fig. 7 including three tags beneath the ribbon and a portion of the tag feeding bars or arms.

8) is fed in one direction beneath the printing wheels 23, and in an opposite direction beneath the printing wheels 40, as will be understood from the following detailed description of the ribbon mechanism. As best illustrated in Figs. 2, 7 and 8, two shafts 56 and 57, projecting outwardly from the plate 49, rotatably support the ribbon spools 58 and 59 and ratchet wheels 60 and 61 respectively. Ratchet wheel 60 is fixed for rotation with ribbon spool 58 and ratchet wheel 61 is fixed for rotation with ribbon spool 59. When spool 58 is driven to wind up the ribbon 55, spool 59 is free to pay out the ribbon, and conversely when spool 59 is driven to wind up the ribbon, spool 58 is free to pay out the ribbon.

The ratchet wheels 60 and 61 are driven by feed pawls 62 and 63 respectively, but the construction is such that only one ratchet wheel can be driven at a time as will now be described. Pawl 62 and the upper end of link 64, are pivoted at 65 to driven lever 66, and the lower end of link 64 is pivoted upon a stud 67 projecting sidewardly from plate 49. Also pivotally mounted upon stud 67 is a lever 68 having two arms 70 and 71. A spring 72 has one end attached to arm 71 and its other end anchored upon a stud 73 projecting from the driven lever 66. This spring serves to normally bias the arm 70 towards the ribbon spool 58.

Similarly, pawl 63 and the upper end of link 74 are pivoted at 75 to the driven lever 66, and the lower end of said link 74 is pivoted upon a stud 76 also projecting sidewardly from the plate 49. A second lever 77 having two arms 78 and 80 is pivotally mounted upon the stud 76, and the arm 78 is normally biased toward the spool 59 by a spring 81, the upper end of which spring is anchored to stud 82 on lever 66, and its lower end is connected to arm 80, as clearly illustrated in Fig. 7.

A pair of detent pawls 83 and 84, pivotally mounted upon the plate 49 by studs 85, cooperate with the feed pawls 62 and 63 respectively to prevent any retrograde movement of the ratchet wheels 60 and 61 while they are being driven. Each detent pawl 83—84 is positioned above its respective feed pawl 62—63, and the construction is such that when a feed pawl is held inoperative by the toggle arm 86, its respective detent pawl is also held inoperative as clearly illustrated in Fig. 7. The toggle arm 86 is pivoted upon a stud 87, which projects from the driven lever 66, and a U-shaped spring 88 serves to hold the toggle arm 86 either on one side or the other of pivot stud 87 until its position is reversed by the action of one or the other of the two ears 79 and 89 of arms 71 and 80 respectively. The spring 88 is anchored at its two ends by pins 90 and 91, pin 90 being mounted on the toggle arm 86 and pin 91 mounted on the driven lever 66. The feed pawls 62—63 are normally urged into engagement with their respective ratchet wheels 60 and 61 by a spring 92 the ends of which are anchored to the feed pawls as clearly shown.

As illustrated in Fig. 7, the ribbon feed mechanism is set for feeding the ribbon 55 from spool 58 to spool 59. With the parts in this position it will be observed that toggle arm 86 is holding the feed pawl 62 and detent pawl 83 inoperative, or free from their ratchet 60, while feed pawl 63 and detent pawl 84 are permitted to engage with their ratchet 61.

To oscillate the driven lever 66 there is provided a drive arm 93 which is pivoted intermediate its ends upon a stud 94 mounted on the left side plate 2. The lower end of arm 93 carries a roller 95 which is held engaged with the periphery of a cam 96 by a spring 98. The cam 96 is fast upon main shaft 97 for rotation therewith. The upper end of arm 93 is pivotally connected to driven lever 66 by a shoulder stud 99.

It will now be clear that whenever main shaft 97 is rotated, arm 93 will be oscillated upon its pivot 94 by cam 96 and roller 95, and lever 66 will be oscillated fore and aft of the machine. As before mentioned, when the ribbon drive is set in the position shown in Fig. 7, ribbon 55 is being wound upon spool 59 and unwound from spool 58. It will therefore be obvious that as the ribbon 55 gradually builds up upon spool 59, arm 78 will cause lever 77 to rotate counterclockwise upon its pivot 76, and as the ribbon is gradually removed from spool 58, spring 72 will cause lever 68 to rotate counterclockwise upon its pivot 67 to move ear 79 upwardly into the path of finger portion 100, of toggle arm 86. Accordingly, when ear 79 is elevated into the path of finger 100, toggle arm 86 is caused to flip clockwise on its pivot 87 to disengage feed pawl 63 and detent pawl 84 from ratchet 61, and engage feed pawl 62 and detent pawl 83 with ratchet 60, thus reversing the ribbon feed so that ribbon 55 will now be wound upon spool 58 and unwound from spool 59.

TAG FEEDING MECHANISM

Figure 1:
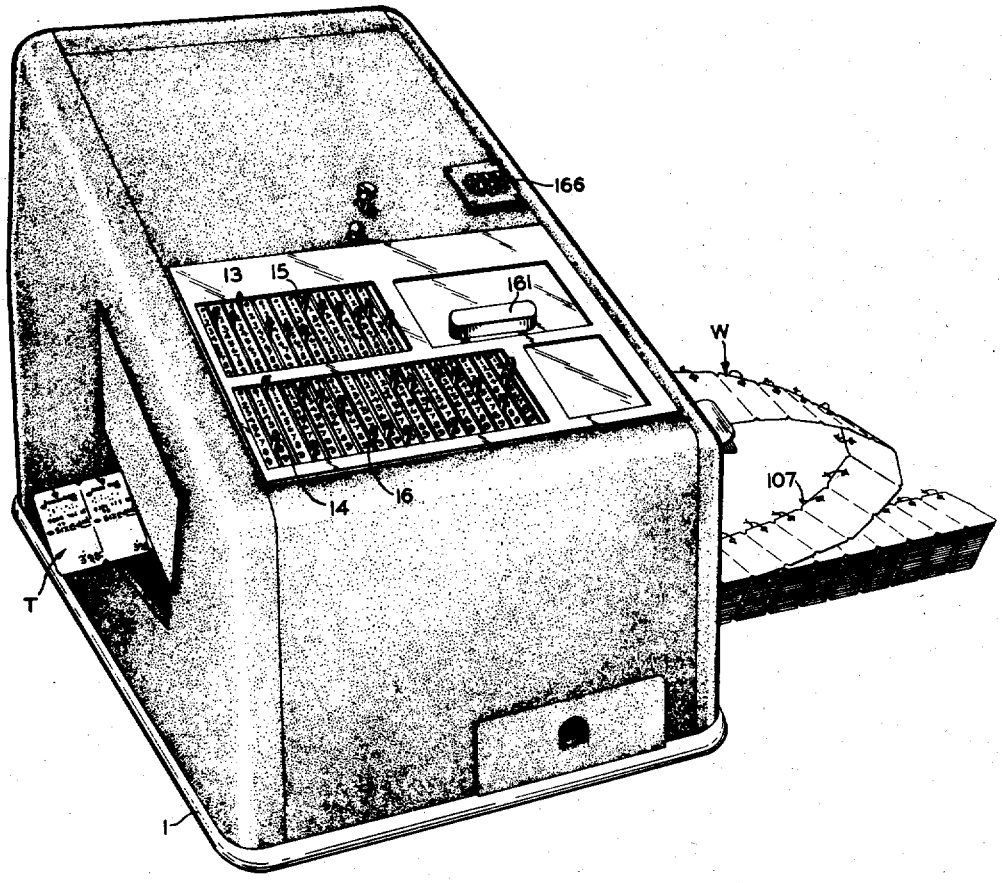
Fig. 1 is a front perspective view of a tag-marking machine embodying the features of the present invention.
Figure 9:
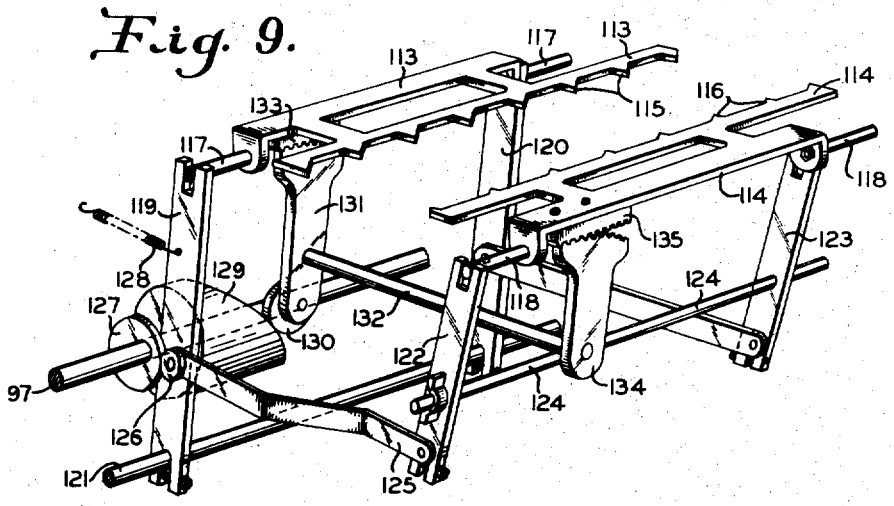
Fig. 9 is a perspective view of the tag feeding bars and driving means therefor.

Before describing the tag feeding mechanism in detail, a brief description of one form of tag will be given in connection with Figs. 14 and 16. The tags to be used with the present machine are preferably, but not necessarily, supplied in continuous strip or web [form] *made up of individual tag parts,* as shown in Fig. 1, with the [tags] *tag parts* severed from one another except for the lands indicated at 106 as shown in Fig. 14. Each tag *part* may be supplied with an attaching string 107, looped through the hole 108, and preprinted with any desired data such as a company name indicated at 110 and, in the present example, with the word "Size" and a "bracket" as clearly shown in Fig. 16. The string end of each tag *part* has its left hand corner cut off as indicated at 111, and both corners at the opposite end are cut off as indicated at 112. By cutting off the corners of the [tags] *tag parts* in this fashion, spaced notches are formed to enable a continuous web or strip of [tags] *tag parts* to be intermittently and successively fed through the machine by the tag feeding mechanism, now to be described in detail, attention being directed especially to Fig. 9.

A pair of claw-like feeding bars 113 and 114, having spaced teeth 115 and 116 respectively, are moved toward and from each other fore and aft of the machine and reciprocated in unison transversely of the machine, when feeding tags T through the machine. The tag feeding bars 113 and 114 are provided with stub shafts 117 and 118 respectively. The stub shafts 117 slidably fit within slots in the upper end of a pair of levers 119 and 120, which levers are pivotally supported at their lower end by a cross shaft 121 mounted in the side frames 2 and 3. Similarly, the stub shafts 118 slidably fit within slots in the upper end of a second pair of levers 122 and 123, which are fast upon a suitably journaled transverse shaft 124. A link 125 pivotally connected at one end to lever 119, above the pivot shaft 121, and pivotally connected at its other end to lever 122 below the pivot shaft 124, serves to move the feeding bars 113—114 toward and from each other when levers 119, 120, 122 and 123 are rocked on their respective pivot shafts 121—124. The means for rocking the levers 119—120 and 122—123 comprises a roller 126 rotatably mounted near the lower end of lever 119 and held against the periphery of cam 127, fast on the main shaft 97, by a spring 128. It will now be understood that during each revolution of main shaft 97 and cam 127, feeding bars 113—114 will be caused to move towards each other to engage and feed the [tags] *tag parts* T, and then be moved away from each other to disengage the tags.

In addition to the feeding bars being moved longitudinally of the machine, as just described, they are also simultaneously moved transversely of the machine by the following mechanism. A cam 129 fast on main shaft 97, adjacent cam 127, drives a roller 130 which is rotatably carried by the lower end of gear segment 131. This segment is fast on one end of a longitudinal shaft 132 and its gear teeth are in permanent sliding mesh with a rack 133 fixed to the feeding bar 113. A second gear segment 134, fast on the opposite end of shaft 132, has teeth which are in permanent sliding mesh with a rack 135 fixed to the feeding bar 114.

Besides the fore and aft and side to side motion of bars 113 and 114, just described, they have a third movement in an up and down direction during tag feeding, in a manner now disclosed in connection with the moving parts of the punch section of the machine.

PUNCH SECTION

Figure 17:
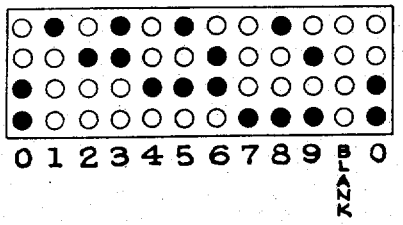
Fig. 17 represents the four hole code used for the punches in the illustrated machine.

It has been previously pointed out that the present machine is designed for thirty columns of information, and that this information is represented by a four hole code as indicated in Fig. 17. It follows therefore that the present machine has one hundred and twenty punches 145 and a like number of pins 135. The punches and their associated pins are arranged in two distinct groups, one group having ninety six punches and a like number of pins and the other group having twenty four punches and a like number of pins. In the present embodiment, the group of twenty four punches are utilized to punch the price, in code, at the bottom of the tags T as shown in Figs. 14 and 16 while the group of ninety six punches are used to punch the other data in the tag, in code, such as manufacturer number, date, etc. as previously described. This arrangement of punches is merely illustrative and is not to be interpreted in a limiting sense.

Figure 19:
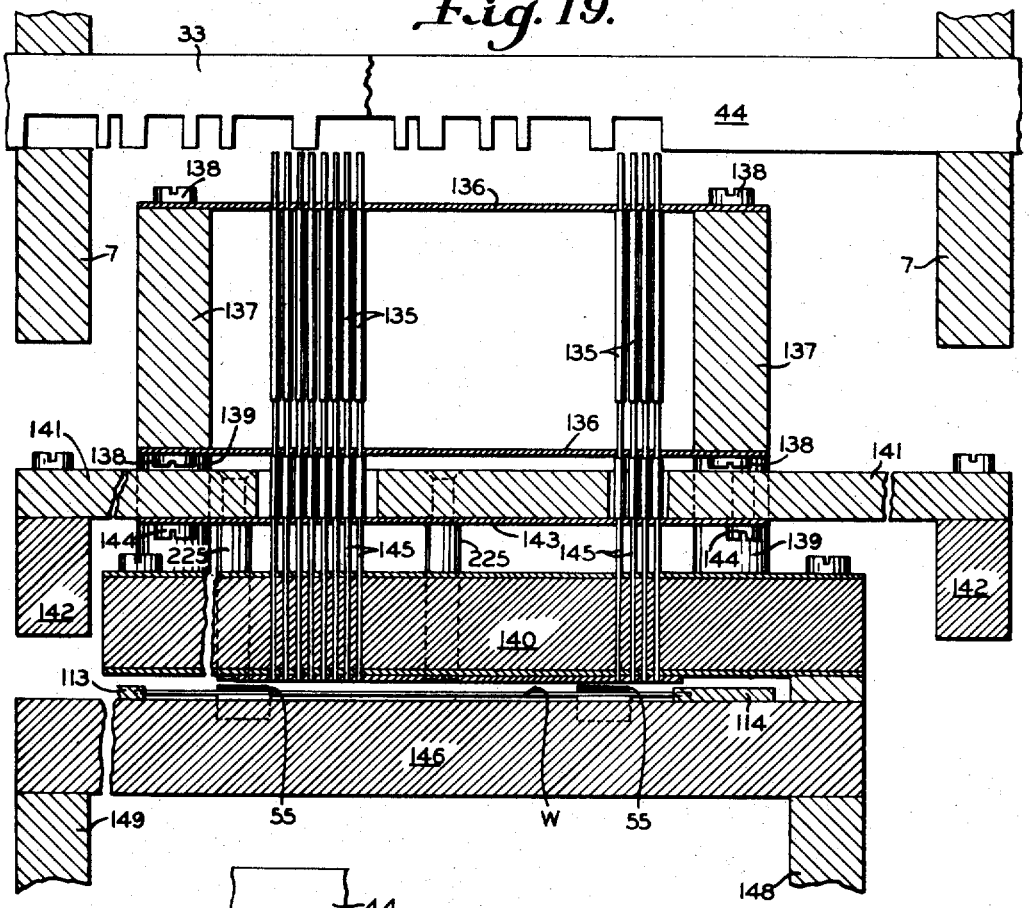
Fig. 19 is an enlarged off-set vertical sectional view taken on a plane indicated by line 19—19 of Fig. 21.
Figure 20:
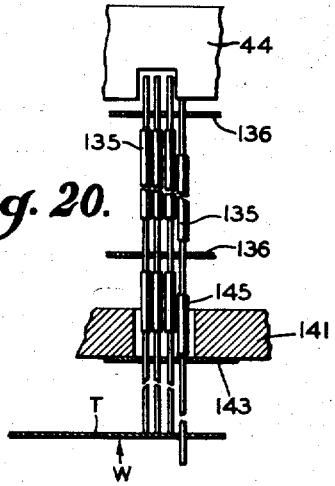
Fig. 20 is a fragmentary detail sectional view showing four punches one of which is actuated by its associated gag bar and pin to perforate a tag, and, Fig. 21 is a perspective view showing particularly the punch mechanism and tag feeding mechanism.
Figure 21:
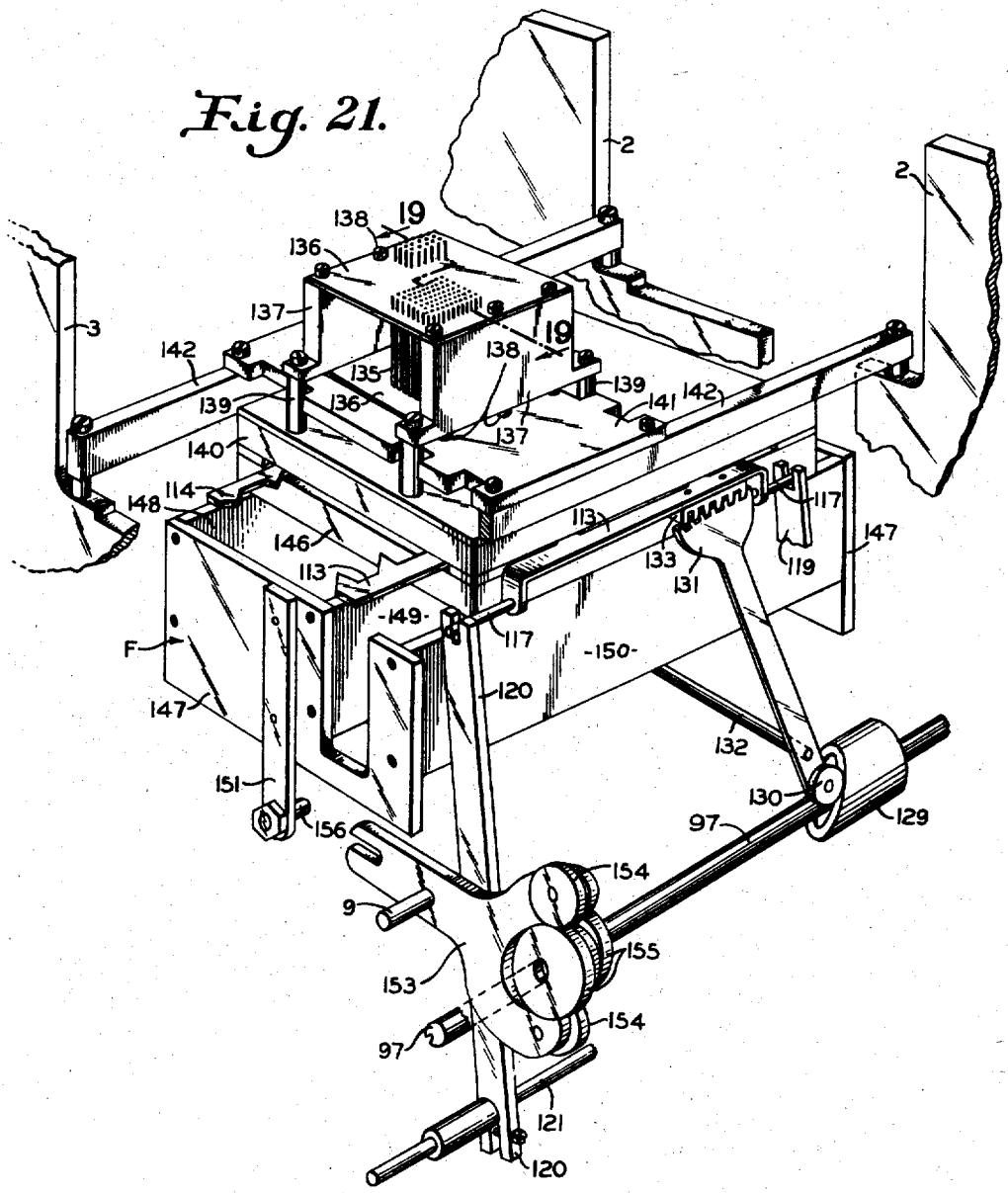

Referring now to Figs. 19, 20 and 21, the pins designated 135, are mounted for axial movement between a pair of horizontal plates 136, fastened to a pair of vertical plates 137, by screws 138. The plates 137 are in turn supported by spacers 139 (Fig. 21) attached to the punch block 140. Mounted between the bottom plate 136 and punch block 140 is a stationary plate 141 carried by a pair of cross bars 142. The bars in turn, are supported by and fixed to the machine side plates 2 and 3 respectively as shown best in Fig. 21. A stripper plate 143 is secured to the underside of stationary plate 141 by screws 144 to cooperate with the headed end of the punches 145 to withdraw them from the tags T in a manner well known to those skilled in the art.

Punch block 140 is supported by and spaced from a bed plate 146 which in turn is carried by a box-like frame F comprising two end walls 147 and three transverse walls 148, 149 and 150 respectively. A slide 151 (see Figs. 18 and 21) is provided for each end wall 147, and both slides are mounted for vertical sliding movement within guideways 152, carried by the side plates 2 and 3 respectively. Means are provided for positively raising and lowering the slides 151 for each revolution of main shaft 97. The slides in turn raise and lower the box-like frame F, feed arms 113—114, punch block 140 and pin frame 136—137. This means comprises a pair of levers 153 pivotally mounted upon studs 9 projecting inwardly from the main side plates 2 and 3 respectively. The bifurcated ends of levers 153 have rollers 154 which cooperate with the periphery of complementary cams 155 respectively fast on the main shaft 97. The forward forked end of levers 153 operatively receive pins 156 projecting inwardly from the lower end of slides 151.

MAIN SHAFT

Main shaft 97 is rotatably journaled in suitable bearings carried by the main side plates 2 and 3 respectively, and is driven by an electric motor M through a suitable worm 157, worm gear 158 and a clutch 159 of any conventional design. The worm is keyed to motor shaft 160 and the worm gear is fixed with a part of the clutch 159 and free on main shaft 97. The construction is such that when the starting button 161 is depressed, a bell crank 162 is caused to rock clockwise upon its pivot 163 as viewed in Fig. 18 to lower link 164 thus engaging the clutch 159 to operatively connect motor M with main shaft 97.

COUNTER MECHANISM

The counter mechanism of the present machine is designed to control the number of tags to be printed and perforated with information set up in the keyboard. As to whether these tags are single part tags, double part tags, triple part tags or quadruple part tags depends upon the setting of hand dial 165 shown best in Fig. 11. This dial may be considered the tag make-up control and in turn controls the feeding of the counter dials 166 and cut-off punches 199 in a manner now to be described.

Figures 11, 12:
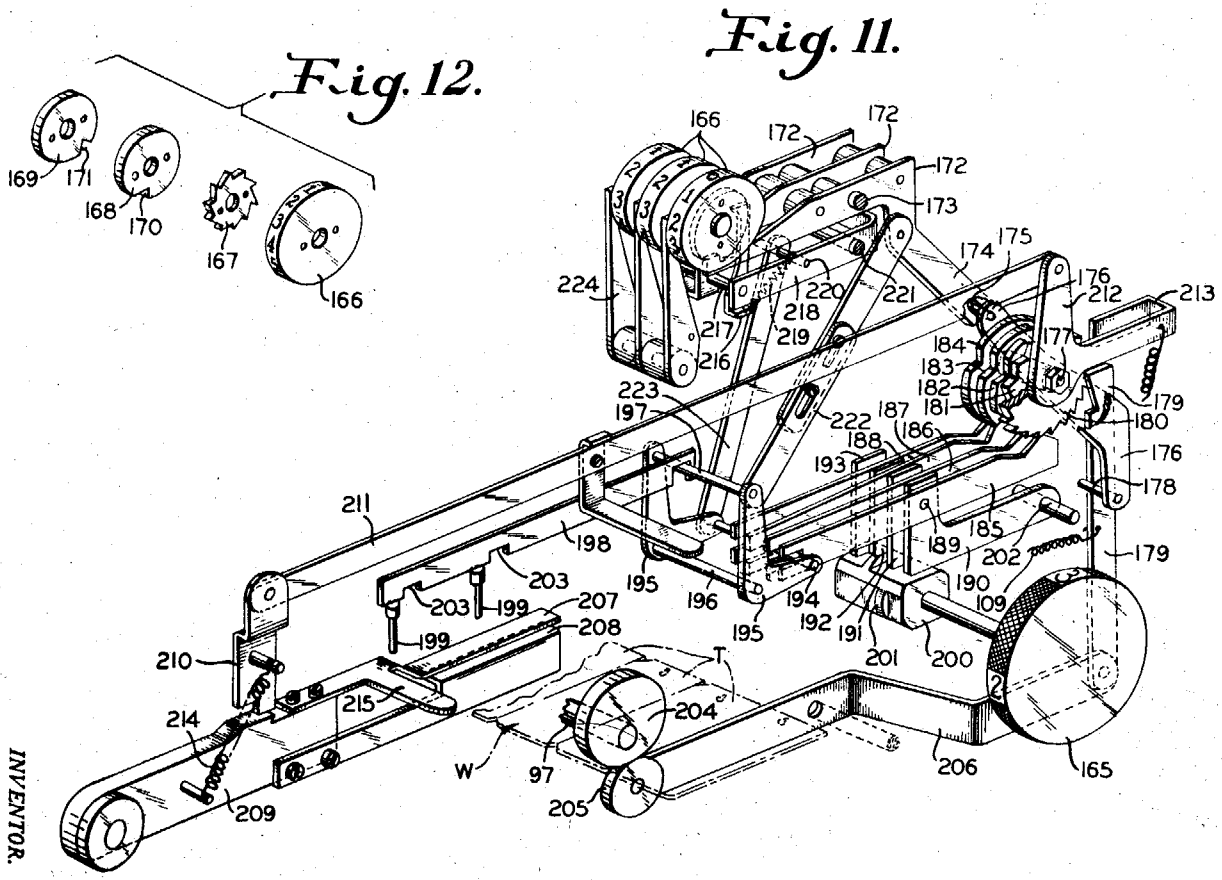
Fig. 11 is a perspective view of the counter mechanism and its relation with the tag cut-off mechanism.
Fig. 12 is an exploded perspective view of one counter dial assembly.

The counter unit shown in Figs. 11 and 12 comprises three dials indicated at 166, each of which have numerals zero to nine on their periphery. Each of the three dials has a ten toothed ratchet 167 and a pair of discs 168 and 169 fixed for rotation therewith. The disc 169 and its notch 171 serve as the carry control between the dials 166 in the conventional and well known manner. When dials 166 are set in their zero position, the toothed ends of three levers 172 are engaged with the notches 170 in discs 168, and said levers are made rigid with one another to rock in unison upon a shaft 173 projecting inwardly from the right hand side plate 3. The right hand lever 172 has a downwardly and rearwardly projecting arm 174, the free end of which is bifurcated to receive a stud 175, carried by a two armed lever 176, the latter being pivotally mounted upon a shaft 177 also carried by the right hand side plate 3. The lower arm of lever 176 has an inwardly projecting pin 178 which serves to engage and disengage the feed end of lever 179, with a feeding ratchet wheel 180. Lever 179 is held against pin 178 by a spring 109. It may now be pointed out that when all of the dials 166 are set at zero, the feeding end of lever 179 is held out of engagement with ratchet wheel 180 by pin 178, and that when any one or all of the dials 166 are moved out of zero position, levers 172 will be rocked counterclockwise on their pivot shaft 173, which in turn rocks the two-armed lever 176 clockwise on its pivot shaft 177 to engage the feed end of lever 179 with ratchet wheel 180.

Figure 13:
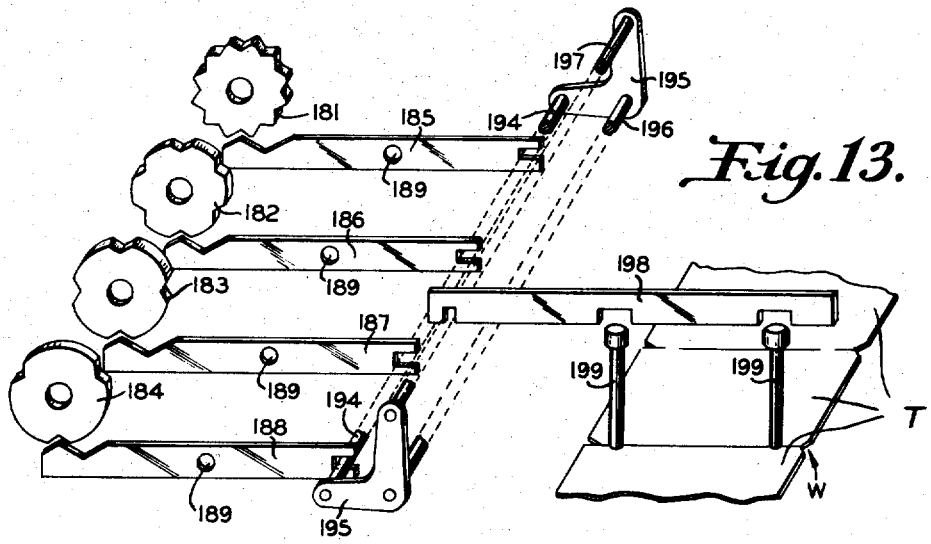
Fig. 13 is an exploded isometric view of the tag cut-off mechanism and control therefor.

Fixed for rotation with ratchet wheel 180, on shaft 177, are four cams 181, 182, 183 and 184 respectively as best shown in Figs. 11 and 13. Cam 181 has twelve notches on its periphery, cam 182 six notches, cam 183 fourth notches and cam 184 three notches as clearly shown in the exploded view Fig. 13. Cooperating with the four cams, are four levers 185, 186, 187 and 188 respectively which are pivoted at 189 to the vertical arms of bell cranks 190 and 193 respectively as shown in Fig. 11. The levers 185 to 188 are beneath and in vertical alignment with said cams 181 to 184 respectively, and their bifurcated ends receive a shaft 194 carried by the bell cranks 195. The bell cranks 195 are pivotally mounted upon a shaft 196 extending inwardly from right hand side frame 3, and carry a second shaft 197 which actuates a notched cut-off slide 198 for controlling the tag cut-off punches 199 as will presently be explained.

By a study of Figs. 11 and 13 it will be seen that a four sided cam 200, fast upon the shaft of dial 165, has four staggered cam faces 201 spaced 90° apart which are beneath and in vertical alignment with the bell cranks 190 to 193 respectively. The construction is such that when single part tags are desired, dial 165 is set at the "number one" position, when two part tags are desired, dial 165 is set at the "number two" position, and so on. To illustrate, when dial 165 is set at the "number one" position, the cam surface 201 in alignment with bell crank 190 rocks said bell crank clockwise (Fig. 11) on its pivot shaft 202 which in turn raises the toothed end of lever 185 into operative engagement with one of the twelve notches in cam 181. It will now be clear that each time the toothed end of lever 185 passes from one notch in cam 181, to the next notch, lever 185 will be rocked upon its pivot 189 and in turn will rock bell cranks 195 counterclockwise to shift the notched cut-off slide 198. Whenever the notches 203 in slide 198 are moved out of registration with the cut-off punches 199 (which position is shown in Fig. 11), a *complete* tag is severed from the web being fed into the right hand side of the machine. *The punches 199, Fig. 13, operate to remove the lands 106, Fig. 14, leaving notches 105' in the severed tag parts.*

The feed lever 179, previously referred to, is elevated and lowered for each revolution of main shaft 97 by cam 204 fast on the main shaft 97 and a roller 205 on one end of a pivoted lever 206, as clearly illustrated in Fig. 11.

It is desirable to stop feeding the continuous web of tags when all of the counter dials 166 reach their zero or home position. This is accomplished by lifting the entering end of the continuous web out of the path of feeding bars 113 and 114 by mechanism now described in connection with Fig. 11. The entering end of continuous web W passes between a pair of parallel plates 207 and 208 mounted upon one end of a lever 209 which lever is pivoted upon the side plates 3. The lever 209 is held in its lowered position by a pivoted latch 210, and a link 211 has its forward end pivotally connected to the upper end of said latch 210, and its rearward end pivotally connected with one arm of a bell crank 212 which is pivoted upon the cam shaft 177. The bell crank 212 has a second arm 213 in vertical alignment with the top end of feed lever 179. It will be remembered that when any counter dial 166 is away from zero or home position, feed lever 179 is engaged with ratchet 180, and when said lever is thus engaged with said ratchet, it will clear the arm 213 during its upward or feeding stroke. However, as soon as all of the dials 166 are normalized, or reach their zero home position, pin 178 will act to disengage lever 179 from ratchet 180 and move said lever beneath arm 213, so that upon its next upward or feeding stroke, it will strike arm 213 thereby rocking bell crank 212 counterclockwise on its pivot 177. This movement of bell crank 212, through link 211, rocks latch 210 counterclockwise on its pivot, to release lever 209, whereupon it is elevated by a spring 214. This elevating, or upward movement of lever 209, carries the plates 207 and 208 upwardly thereby lifting the entering end of continuous web W, free of the feeding bars 113 and 114.

It has been previously explained that whenever any of the counter dials 166 are manually moved away from their home or zero position, lever 179 is engaged with ratchet wheel 180 to rotate the cams 181 to 184 respectively. The means for returning the dials to zero position, digit by digit will now be described in connection with Fig. 11.

The construction of this mechanism is such that the counter dials are actuated only upon movement of the bell cranks 195 and cut-off slide 198. Thus, if dial 165 is set for a single part tag, the counter and cut-off slide will be operated once for every machine cycle, but when the dial 165 is set at the number two position, for a two part tag, the counter and cut-off slide will be operated only once for every two machine cycles and so forth. In this way the counter can be set for a definite predetermined number of tags regardless of whether they are to be one, two, three or four part tags according to the setting of dial 165.

The counter shown in the present embodiment includes but three counter dials 166. These dials will be considered as the units, tens and hundreds positions. For each dial 166 there is a feed pawl 216 to feed its associated ratchet 167. The pawls 216 are pivotally mounted upon a shaft 217 carried by a U-shaped lever 218, and the feeding end of each pawl is held in engagement with its ratchet 167, by a spring 219, one end of which is anchored to the lower end of the pawl and the other end to a rod 220 carried by the lever 218. The U-shaped lever 218 is pivotally supported by an elongated shaft 221 projecting inwardly from the right hand side plate 3. An adjustable link 222 is pivotally connected at its upper end to arm 174 and at its lower end to shaft 197 carried by the bell cranks 195. A second link 223 is connected between the shaft 194 and rod 220. Each ratchet 167 has a spring pressed detent pawl 224 which serves to hold the counter dials 166 against any retrograde movement between feeding strokes of the pawls 216, and to the position to which they are manually set for counting purposes.

When any dial 166 is moved out of zero position, link 222 will act to rock bell cranks 195 counterclockwise on their pivot shaft 196 to position the notches 203 of cut-off slide 198 above the cut-off punches 199. Thus said punches are disabled until the slide is again moved by action of one of the bell cranks 190 to 193 according to the setting of dial 165.

It will now be clear that the counter dials are returned toward their zero or home position one digit each time the cut-off slide 198 is moved to its cut-off position by one of the levers 185 to 188 respectively through the bell cranks 195.

LOCATING HOLES

It has been previously mentioned that location of the punched coded holes, with respect to the marginal edges of the tag, is of little importance during subsequent sensing by a reader to interpret the information represented by said punched holes. To this end a plurality of punches 225 (shown by full and dotted lines in Fig. 19) are provided to punch a plurality of locating holes 226 (see Fig. 16) in each tag or in each part of each tag in the event the tag is made up of multiple parts. The punches 225 are rigidly mounted in the stationary plate 141, as shown in Fig. 19, and are arranged to punch a series of locating holes 226 every time the bed plate 146 is elevated, or for every machine cycle.

OPERATION

In describing the operation of the present tag-marking machine let it be assumed that one hundred single part tags are to be punched and printed with information contained on the first line of receiving report B shown in Fig. 15. An operator proceeds by setting up this information in the keyboard. This is accomplished by differentially shifting the required keys 13 to 17 respectively to the value positions representing such information. This differential shifting of the keys automatically positions the printing wheels and sets the punch gags for proper printing and perforating of identical information upon each and every one of the one hundred tags to be made. Next the operator sets the counter dials 166 to read "one hundred" which automatically engages the feed lever 179 with ratchet 180 as previously explained. Lever 209 is then lowered, by depression of fingerpiece 215 to align the plates 207 and 208 and web W with the feeding arms 113 and 114 respectively.

Dial 165 is then set to "position one" and the starting button 161 is depressed to engage the clutch 159. During the first six machine cycles the leading tag will be punched and printed in the steps shown from right to left in Fig. 14. In other words it takes six machine cycles to complete the first tag but thereafter a complete one part tag is ejected from the machine after every machine cycle until the counter dials reach their zero or home position, at which time the tag feeding operation is stopped as heretofore explained. It will now be clear that whenever dial 165 is set for two part tags, the counter and tag cut-off mechanisms operate only once for every second machine cycle, and when dial 165 is set for three part tags, the counter and tag cut-off mechanisms operate only once for every three machine cycles etc.

While a particular embodiment of the invention has been shown and described, it will be apparent to those skilled in the art that numerous variations and modifications may be made in the particular construction without departing from the underlying principles of the invention. It is therefore desired, by the following claims, to include within the scope of the invention, all such variations and modifications whereby substantially the results of the invention may be obtained by the use of substantially the same or equivalent means.

The invention claimed is:

1. In a printing and perforating machine, the combination of: selective printing and perforating devices simultaneously settable to print and perforate selective indicia one or more times on a single or multiple tag unit severed from a web which is intermittently fed through the machine, said machine comprising intermittent feeding means for said web and tag unit; settable counter means to control the number of simultaneous printing and perforating impressions in varying cycles of operation to form said single or multiple tag unit; and means intermittently operable to sever the single or multiple tag units from said web under control of said settable counter means, the intermittent feeding means continuing to feed the last completed single or multiple tag unit out of the machine after feed of the web to the printing and perforating devices is discontinued.

2. In a printing and perforating machine, the combination of: selective printing and perforating devices simultaneously settable to print and perforate selective indicia one or more times on *tag parts, a selected number of which constitute* a single or multiple tag unit which is intermittently fed through the machine, said machine comprising intermittent feeding means for said single or multiple tag unit; settable counter means to control the number of simultaneous printing and perforating impressions in varying cycles of operation imparted to said single or multiple tag unit; the intermittent feeding means continuing to feed the last completed tag unit out of the machine after feed of unprinted and unperforated tag units to the printing and perforating device is discontinued; and additional perforating means being provided to perforate at least two locating holes in the tag unit in definite relation to the printed and perforated information applied to the tag unit by said printing and perforating devices.

3. In a printing and perforating machine, the combination of: selective printing and perforating devices simultaneously settable to print and perforate selective indicia one or more times on a single or multiple tag unit severed from a web which is intermittently fed through the machine, said machine comprising control means to set the machine for producing a single tag unit or multiple tag unit; intermittent feeding means for said web and tag unit; settable counter means to control the number of simultaneous printing and perforating impressions in varying cycles of operation to form said single or multiple tag unit; means to sever the single or multiple tag unit from said web under control of said settable counter means; the intermittent feeding means continuing to feed the last completed tag unit out of the machine after feed of the web to the printing and perforating devices is discontinued; and additional perforating means being provided to perforate at least two locating holes in each tag unit in definite relation to the printed and perforated information applied to the tag unit by said printing and perforating devices.

4. In a printing and perforating machine, the combination of: selective printing and perforating devices simultaneously settable to print and perforate selective indicia one or more times on a single or multiple tag unit severed from a web which is intermittently fed through the machine, said machine comprising control means to set the machine for producing a single tag unit or multiple tag unit; intermittent feeding means for said web and tag unit; settable counter means to control the number of simultaneous printing and perforating impressions in varying cycles of operation to form said single or multiple tag unit; means intermittently operable to sever the single or multiple tag units from said web under control of said settable control means; the intermittent feeding means continuing to feed the last completed tag unit out of the machine after feed of the web to the printing and perforating devices is discontinued in each cycle of operation; and additional perforating means being provided to perforate at least two locating holes in the tag unit in definite relation to the printed and perforated information applied to the tag unit by said printing and perforating devices.

5. In a printing and perforating machine, the combination of: selective printing and perforating devices simultaneously settable to print and perforate selective indicia one or more times on a single or multiple tag unit severed from a web which is intermittently fed through the machine, said machine comprising settable control means including a manually settable dial to condition the machine for producing single or multiple tag units; intermittent feeding means for said web and tag unit; settable counter means to control the number of simultaneous printing and perforating impressions in varying cycles of operation to form said single or multiple tag unit; means intermittently operable to sever the single or multiple tag units from said web under control of said manually settable dial; the intermittent feeding means continuing to feed the last completed tag unit out of the machine after feed of the web to the printing and perforating devices is discontinued in each cycle of operation; and additional perforating means being provided to perforate at least two locating holes in the tag unit in definite relation to the printed and perforated information applied to the tag unit by said printing and perforating devices.

6. In a printing and perforating machine, the combination comprising: printing and perforating devices; means to set said devices to simultaneously print and perforate one or more times on a partially severed web which is intermittently fed into the machine; intermittent feeding means for said web; a settable counter for predetermining the number of printing and perforating impressions to be made upon said web by said printing and perforating devices; cut-off means controlled by said counter to sever the web to form single or multiple tag units; and means cooperating with said counter and feeding means to feed the completed tag units from the machine after feed of the web to the printing and perforating devices has been stopped.

7. In a printing and perforating machine of the class described, the combination comprising: selective printing and perforating devices including rotatable printing wheels and a plurality of rows of punches, said devices simultaneously settable to print and perforate single or multiple tag units severed from a web which is intermittently fed into the machine; intermittent feeding means for said web and tag units; a manually settable counter for predetermining the number of tag units to be printed and perforated by said devices; means controlled by said counter to sever said tag units from said web; and means operable to continue the feed of the completed tag units from the machine after feed of the web into the machine has been stopped.

8. In a printing and perforating machine as set forth in claim 7 wherein additional punching means is provided to form at least two locating holes in each tag unit simultaneously with and in definite relation to the printed and perforated information applied to said tag units by the printing and perforating devices.

9. In a printing and perforating machine as specified in claim 1, in which the intermittent feeding means for said web and tag unit includes a pair of feed bars with means to move said bars into gripping engagement with said web and tag unit during their feeding stroke and out of engagement with said web and tag unit during their return stroke.

10. In a printing and perforating machine as specified in claim 2, in which the additional perforating means, for perforating at least two locating holes in the tag unit in definite relation to the printed and perforated information applied to the tag unit, is actuated simultaneously with said first named perforating devices.

11. Apparatus as in claim 2, in which the settable counter means includes a plurality of rotatable and selectively settable counter dials which, upon return to the home position, after being moved therefrom, act to initiate means for discontinuing the feed of said [web] *single or multiple tag units* into the machine.

12. In a printing and perforating machine of the class described, the combination of: selective printing and perforating devices simultaneously settable to print and perforate selective indicia one or more times on *tag parts, a selected number of which constitute* a single or multiple tag unit which is intermittently fed through the machine, said machine comprising intermittent feeding means for said single or multiple tag unit; settable counter means to control the number of simultaneous printing and perforating impressions in varying cycles of operation imparted to said single or multiple tag unit; the intermittent feeding means continuing to feed the last completed single or multiple tag unit out of the machine after feed of unprinted and unperforated tag units to the printing and perforating devices is discontinued; and additional perforating means being provided to perforate at least two locating holes in each tag *part* of the single or multiple tag unit in definite relation to the printed and perforated information applied to the tag unit by said printing and perforating devices.

*13. In a printing and perforating machine, the combination of: selective printing and perforating devices simultaneously settable to print and perforate information upon a succession of tag parts a selected number of which form a tag which is severed from a web intermittently fed through the machine; said machine comprising intermittent feeding means for the web and tag parts; settable counter means to control the number of printing*

*and perforating impressions in forming tags; and means under control of said settable counter means intermittently operable to sever a variable number of tag parts from said web, the intermittent feeding means continuing to feed the last completed tag out of the machine after feed of the web to the printing and perforating devices is discontinued.*

References Cited in the file of this patent or the original patent

UNITED STATES PATENTS

| | | |
|---|---|---|
| 1,104,829 | Ray | July 28, 1914 |
| 1,183,529 | Brasseur | May 16, 1916 |
| 1,233,528 | Werner | July 17, 1917 |
| 1,855,764 | Laencher | Apr. 26, 1932 |
| 1,916,966 | Cunningham | July 4, 1933 |
| 1,986,678 | Laencher | Jan. 1, 1935 |
| 2,002,437 | Maul | May 21, 1935 |
| 2,007,526 | Flood | July 9, 1935 |
| 2,041,943 | McCain | May 26, 1936 |
| 2,048,396 | Lasker | July 21, 1936 |
| 2,050,745 | Woodruff | Aug. 11, 1936 |
| 2,068,914 | Handley | Jan. 26, 1937 |
| 2,076,705 | Carroll | Apr. 13, 1937 |
| 2,104,647 | Henry | Jan. 4, 1938 |
| 2,120,936 | Kohnle | June 14, 1938 |
| 2,168,763 | Daly | Aug. 8, 1939 |
| 2,189,027 | Fuller | Feb. 6, 1940 |
| 2,265,222 | Benes | Dec. 9, 1941 |
| 2,372,460 | Turner | Mar. 27, 1945 |
| 2,406,726 | Weimont | Aug. 27, 1946 |
| 2,431,714 | Sundstrand | Dec. 2, 1947 |
| 2,578,700 | Harrold | Dec. 18, 1951 |